No. 639,265. Patented Dec. 19, 1899.
W. MORRIS.
BICYCLE BRAKE AND COASTER.
(Application filed Jan. 20, 1899.)
(No Model.) 3 Sheets—Sheet 1.
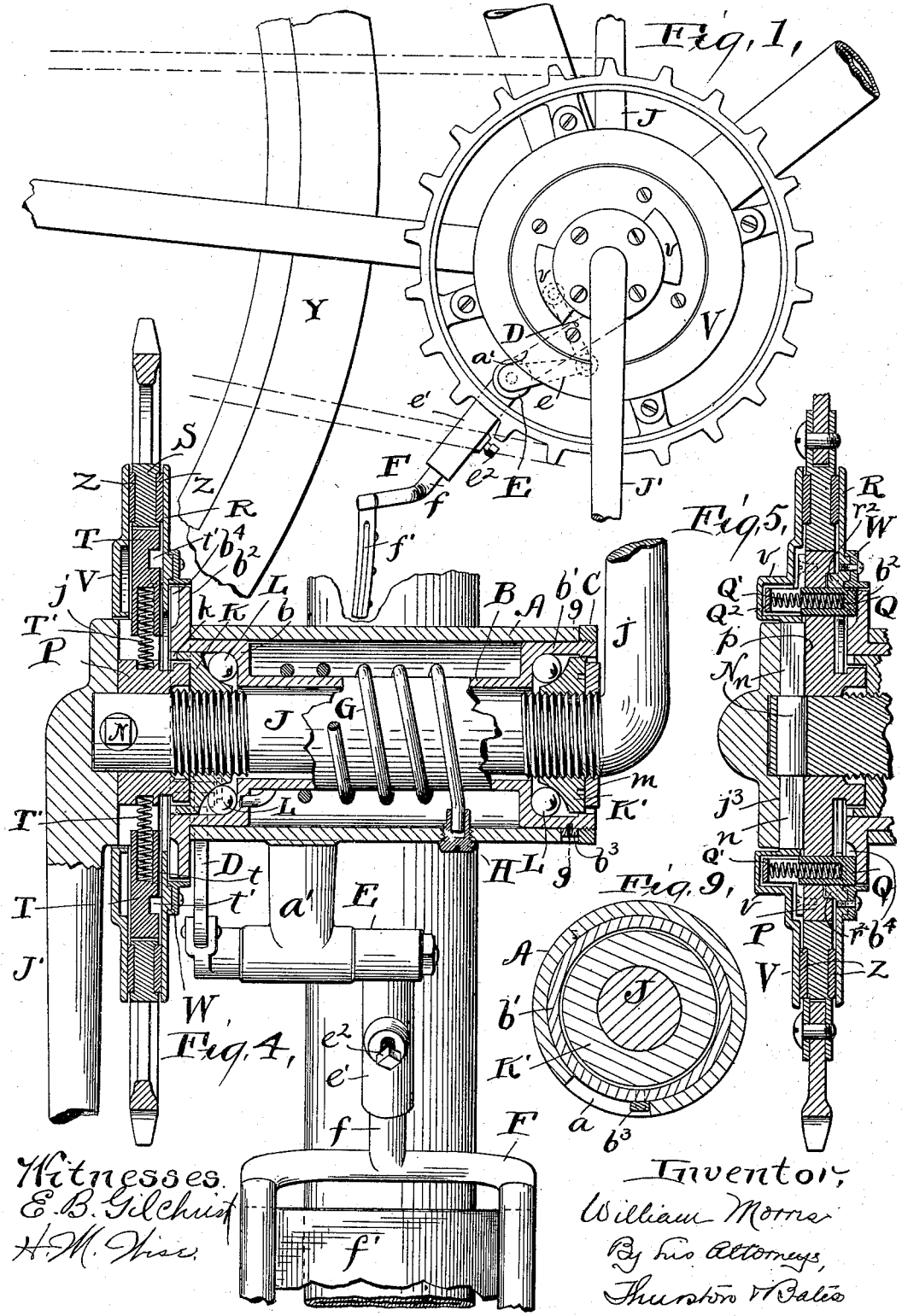

No. 639,265. Patented Dec. 19, 1899.
W. MORRIS.
BICYCLE BRAKE AND COASTER.
(Application filed Jan. 20, 1899.)
(No Model.) 3 Sheets—Sheet 2.
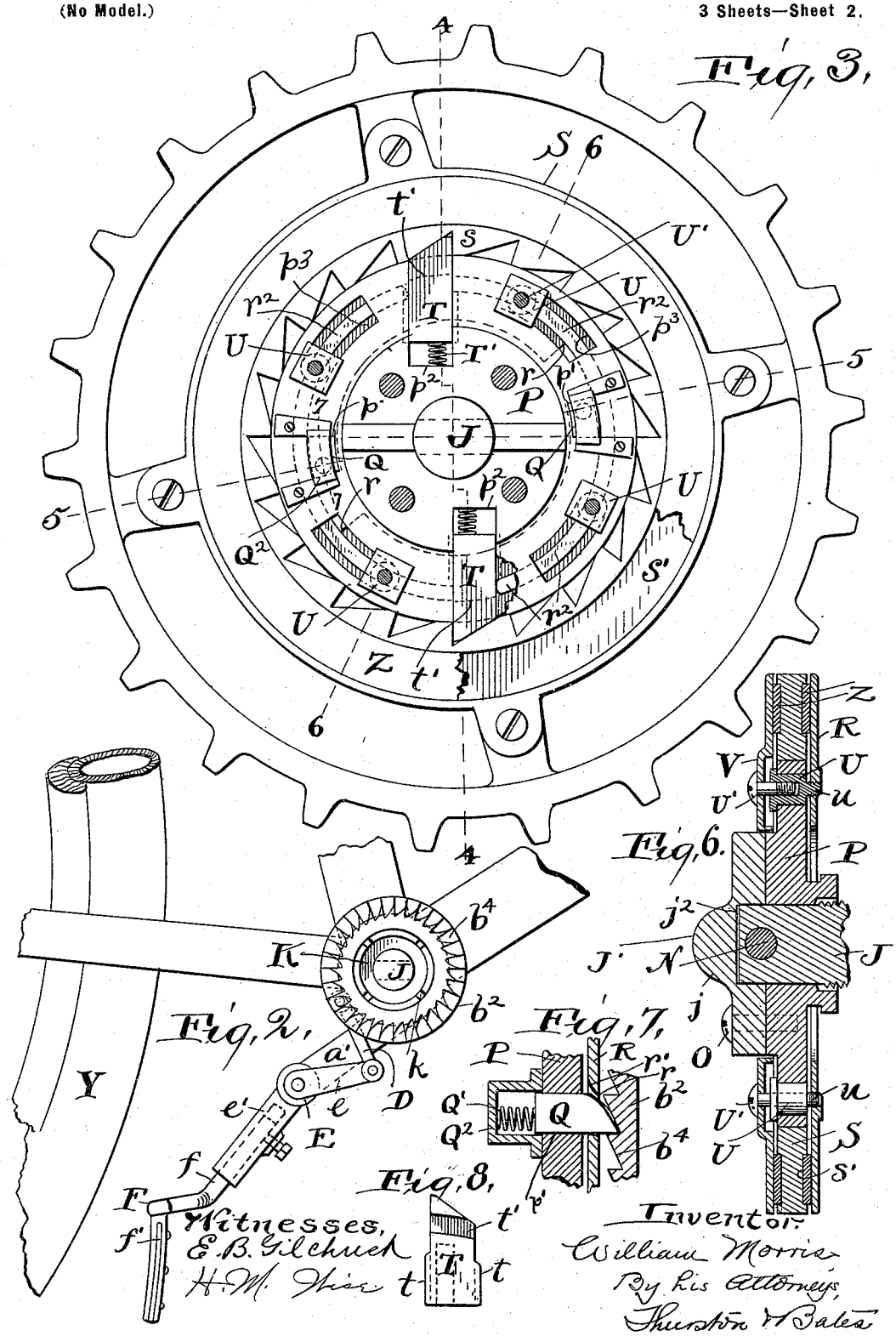
THE NORRIS PETERS CO., PHOTO-LITHO., WASHINGTON, D. C.

No. 639,265. Patented Dec. 19, 1899.
W. MORRIS.
BICYCLE BRAKE AND COASTER.
(Application filed Jan. 20, 1899.)
(No Model.) 3 Sheets—Sheet 3.

Witnesses.
E. B. Gilchrist
Philip E. Knowlton

Inventor:
William Morris,
By his Attorneys,
Thurston & Bates

UNITED STATES PATENT OFFICE.

WILLIAM MORRIS, OF CLEVELAND, OHIO.

BICYCLE BRAKE AND COASTER.

SPECIFICATION forming part of Letters Patent No. 639,265, dated December 19, 1899.

Application filed January 20, 1899. Serial No. 702,767. (No model.)

*To all whom it may concern:*

Be it known that I, WILLIAM MORRIS, a citizen of the United States, residing at Cleveland, in the county of Cuyahoga and State of Ohio, have invented a certain new and useful Improvement in Bicycle Brakes or Controllers, of which the following is a full, clear, and exact description, reference being had to the accompanying drawings.

The object of my invention is to provide a bicycle brake or controller which is adapted to be applied by back-pedaling, but which shall in no wise interfere with or retard the forward movement of the driving mechanism and which shall allow the cranks to be disengaged from the driving-gear without applying the brake, whereby the bicycle may be used in coasting without revolution of the cranks and the brake may be applied with the desired force by back-pedaling.

The invention consists in the combination, with the brake mechanism, the crank, and the driving-gear, of intermediate mechanism adapted to normally connect the crank with the driving-gear, but also adapted by the relatively forward movement of the driving-gear when the cranks are retarded to release that gear from the cranks and to engage the brake mechanism, which may be applied as desired by back-pedaling.

The invention may also be summarized as consisting in the combination of parts hereinafter described, and definitely enumerated in the claims.

Figure 10:
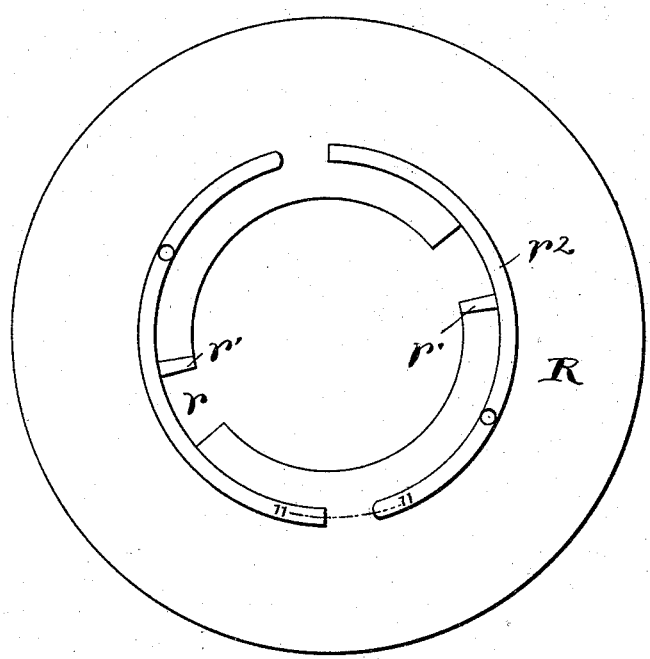
Figure 11:
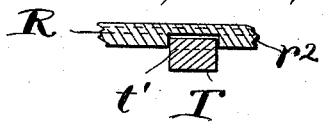

The drawings clearly disclose my invention. Figure 1 is a side elevation of the same, showing a portion of the bicycle frame and wheel; and Fig. 2 is a similar side elevation with the driving mechanism removed. These figures are on a scale half the size of the succeeding figures. Fig. 3 is a side elevation from the same point of view with the crank and surrounding plate removed. Fig. 4 is a vertical central section through the axis of the shaft looking toward the rear of the wheel, this view for convenience being taken on the offset line 4 4 of Fig. 3. Figs. 5 and 6 are similar sections on lines 5 5 and 6 6, respectively, of Fig. 3. Fig. 7 is a detail showing the operation of the pawl which engages the brake mechanism, being a section on the line 7 7 of Fig. 3 looking toward the rear of the machine. Fig. 8 is a detail elevation of the pawl which engages with the sprocket looking at the innermost side of the pawl. Fig. 9 is a vertical transverse section on line 9 9 of Fig. 4. Fig. 10 is an outer face view of the plate designated R. Fig. 11 is a cross-section on the line 11 11 of Fig. 10, showing also the position of the pawl T.

The same letters of reference designate the same parts in each figure.

Referring to the parts by letters, A represents the crank-hanger of a bicycle-frame. Within this hanger is a sleeve B, having the integral ball-cups $b\ b'$, which are embraced by the hanger. This sleeve is held longitudinally in place by the disk $b^2$ on the sprocket end of the sleeve and on the other end by a threaded collar C screwing onto the ball-cup $b'$. The sleeve is limited in rotative movement by a peg $b^3$, secured to the ball-cup $b'$ and taking into a notch or slot $a$ in the hanger.

Pivoted to the disk $b^2$ is the link D, which (with the brake applied at the point shown in the drawings) is connected at its other end to the rock-lever $e$. This rock-lever extends from a shaft E, which has bearings in a bracket $a'$, secured to the crank-hanger. To the other end of this shaft is secured the tubular lever $e'$, and within this lever takes the shank $f$ of a forked yoke F, the forks of which carry a piece of leather or similar material $f'$, which forms the braking member. This yoke is adjustable by means of the set-screw $e^2$, carried by the tubular lever $e'$.

The disk $b^2$ has radially-disposed ratchet-shaped teeth $b^4$ on its outer face, which are adapted to be engaged by pawls, as hereinafter described, to partially rotate the disk. When the disk is thus partially rotated in the left-hand direction, the link D shoves downward on the lever $e$ and brings the braking-surface $f'$ against the tire Y of the wheel. The peg $b^3$, engaging with the end of the notch $a$ in the hanger, limits the movement that may be thus given to the brake, and the brake-yoke is so adjusted within the tubular lever $e'$ that when the extreme movement is given to the sleeve B the braking-surface shall bear against the tire with the desired maximum force. This arrangement of adjustable brake and positive stop prevents the brake being applied hard enough to injure the tire.

A spring G, coiled around the sleeve B and secured to that sleeve at one end and at the other end within a tubular opening in a screw H, screwing into the hanger A, operates to return the brake to its inactive position as soon as the pawls before referred to are withdrawn from engagement with the teeth $b^4$.

The crank is made, preferably, in two parts, the crank-shaft J having the integral crank-arm $j$ at one end and the crank-arm J' secured to the other end of the shaft, as hereinafter explained. The crank-shaft is journaled within the sleeve B on ball-bearings. These bearings are furnished by the ball-cups $b$ $b'$ of the sleeve, the cones K and K', screwed onto the shaft J, and the balls L, rolling between the cups and cones. The cone K is screwed up tightly (by means of a spanner-wrench taking into notches $k$ in the cone) against the hub of a peculiarly-formed disk P, which bears at its outer side against a key N, driven through the shaft J. This key where it passes through the shaft is round in section and slightly tapered. It has ends $n$ extending in each direction from the shaft, which ends are square in section and are partially embedded in a groove $p'$ in the disk P. The bearing is adjusted by the cone K', which is turned by a spanner-wrench and locked in position by the jam-nut M. The crank-arm J' has at its inner end an integral disk $j$, in which there is a circular recess $j^2$ to receive the end of the shaft J and a groove $j^3$ to receive the projecting ends $n$ of the key N. This crank-arm is rigidly secured to the disk P by screws O. Thus when the parts are locked up the crank-shaft, cranks, cones, and disk P all revolve as one member.

Carried in diametrically-opposed openings $p'$ in the disk P are ratchet-faced pawls Q, which are given a pressure inward by springs Q', contained partially within recesses in the pawls and bearing at their outer ends against stirrups $Q^2$, secured to the disk P. When these pawls are allowed to be pressed inward under the action of their springs, they engage with the teeth $b^4$ of the disk $b^2$, thus for the time being locking the disk P and the disk $b^2$, (as far as left-hand rotation is concerned,) whereby if the cranks are back-pedaled the brake will be applied.

The pawls Q are normally held out of engagement with the disk $b^2$ by means of the plate R, which has openings $r$, through which the pawls pass when in engagement with the disk $b^2$. There is, however, relative movement between the plate R and the disk P, and in this movement the inclined edge $r'$ of the opening or notch $r$ engages the bevel face of the pawl Q and withdraws the same from the disk $b^2$, and the pawl coming over the imperforate part of the plate R is thereby retained out of engagement with the disk $b^2$. This is the normal position of the parts. An annular ring W is secured to the inner side of the plate R close to the disk $b^2$ to form a dust-cap.

The disk P is normally connected with the driving-gear, which is shown as a sprocket S, by means of the pawls T, which lie in the recesses $p^2$ in the disk P. These pawls T are normally pressed outward by springs T', contained partly within recesses in the pawls, whereby the pawls engage with the sprocket by means of the annularly-placed ratchet-teeth $s$ thereon. The disk P and therefore the cranks are thus normally locked to the sprocket, as far as forward movement is concerned. The pawls T have on their inner sides thin wings $t$, which overlap the edges of the opening $p^2$ and serve to guide the pawls, the pawls being prevented from movement toward the hanger by the plate R.

In the inner side of the pawls T are shoulders formed by the arc-shaped grooves $t'$, which when the pawls are in engagement with the sprocket stand beyond the similarly-curved ribs $r^2$ on the plate R, the ribs being interrupted for a distance equal to the width of the pawls, and thus being, in effect, lugs whose ends normally bear against one side of the pawls. This prevents the relative rotative movement of the plate R. The ends of the ribs do not crowd the sides of the pawls sufficiently, however, to prevent the inclines on the sprocket S from forcing the pawls radially inward, and this takes place when the sprocket is turned relatively backward by back-pedaling. This inward movement of the pawls causes the grooves $t'$ to register with the ribs $r^2$. This frees the plate R, which by reason of its friction, as hereinafter explained, is revolved relative to the pawls T, and the ribs thus pass into the grooves $t'$ and lock them in an inoperative position.

The plate R is limited in its movement relative to the disk P by means of the stops U, which take into openings $p^3$ in the disk P. These stops are secured to the plate R in suitable manner, that shown being the screw-threaded stud $u$ on the inner end of the stop. An annular plate V surrounds the disk P and the hub of the sprocket on the outer side, and this plate is secured to the stops U by means of screws U', screwing into the stops. Suitably-recessed bosses $v$ in this plate receive the stirrups $Q^2$. Embedded in annular recesses $s'$ on each side of the sprocket-hub are the fiber washers Z, which furnish sufficient friction between the plates R and V and the sprocket that these plates tend to turn with the sprocket, but do not grasp it rigidly.

In the normal position of the parts the pawls T are in engagement with the sprocket and the pawls Q are held out of engagement with the disk $b^2$ by means of the plate R and the stops U are against the ends of the openings $p^3$, as shown in Fig. 3. In this position of the parts the crank, disk P, sprocket, and plates V and R all revolve together, the wheel being thus driven forward the same as if there were no brake mechanism present. When, however, the cranks are retarded or back-pedaled, the momentum of the sprocket causes it to advance faster than the disk P, and this forces the pawls T inward. Now when the grooves $t'$ come opposite the ends of the ribs $r^2$ this releases the plates R and V, and these plates advance with the sprocket (by reason of the friction with the fiber washers Z) until stopped by the stops U impinging against the other ends of the slots $p^3$. The ends of the slots $p^3$ are thus a pair of separated shoulders which coöperate with the stop U to limit the movement of the plates V and R in each direction. This relative movement of the plate R moves the ends of the ribs $r^2$ into the grooves $t'$ and locks the pawls T out of engagement with the sprocket and at the same time brings the openings $r$ opposite the pawls Q, and the latter being thus released spring into engagement with the disk $b^2$. The crank is thus entirely released from the sprocket and is thrown into engagement with the brake mechanism. If it is desired simply to coast without applying the brake, the pedals are simply held stationary by the feet and the sprocket revolves independently of the crank, the friction of the washers Z being insignificant whenever there is momentum enough to render coasting possible. If it is desired to apply the brake, the crank is simply turned backward, and the brake is applied with the desired force until the maximum is reached as the stop $b^3$ strikes the end of the recess $a$. As soon as forward-pedaling is resumed the disk P moves forward relative to the sprocket and the plate R, and thus the bevel edge $r'$ on the opening $r$ of the latter engaging with the beveled face of the pawl Q withdraws it from the disk $b^2$ and the spring G releases the brake. At the same time the pawls T are carried by the disk P off the ends of the ribs $r^2$, (the plate R being retarded by the friction with the sprocket,) and these pawls spring back into engagement with the sprocket, and the normal operation is resumed.

Having described my invention, I claim—

1. In a bicycle, in combination, a crank, a driving-gear carrying ratchet-teeth, a brake mechanism, a disk revolving with the crank, a pawl carried by said disk, and adapted to engage the ratchet-teeth of the driving-gear, another pawl carried by said disk and adapted to drivingly engage the brake mechanism, and a plate normally revolving with the gear but adapted to have a limited movement independent thereof, and independent of the disk, and means whereby said limited movement operates to release one pawl and lock the other, substantially as described.

2. In a bicycle, in combination, a crank, a driving-gear, a brake mechanism, oppositely-arranged ratchet-surfaces on the gear and brake mechanism, a disk revolving with the crank, a pawl carried by said disk and adapted to engage the driving-gear, another pawl carried by said disk and adapted to engage the ratchet-surface of the brake mechanism, and a plate normally revolving with the gear but adapted to have a limited movement independent thereof, and independent of the disk, and means whereby said limited movement operates to release one pawl and lock the other, substantially as described.

3. In a bicycle, in combination, a crank-shaft, a disk P secured thereto, a driving-gear surrounding said disk and having ratchet-teeth, a pawl T carried by said disk and spring-pressed outward and tending to engage ratchet-teeth on said gear, a disk $b^2$ carried by the hanger of the bicycle and capable of a partial rotation, and having ratchet-teeth arranged oppositely to the ratchet of the driving-gear, mechanism connecting said disk $b^2$ with a braking member whereby the brake is applied when the disk $b^2$ is partially rotated, and a pawl Q carried by the disk P and adapted to engage the ratchet-teeth of the disk $b^2$, and means for preventing the simultaneous operation of said two pawls T and Q, substantially as described.

4. In a bicycle, in combination, a hanger, a normally stationary sleeve within the hanger and revolubly engaging therewith, a plate outside of the hanger at one end thereof and rigidly connected with the sleeve, a brake member connected with the plate and adapted to be applied thereby when a plate is rotated, a suitably-journaled crank-axle within the sleeve, means revoluble with the crank-axle and adapted to engage said plate and partially rotate it when the cranks are back-pedaled, means for returning the sleeve into position to be again operated by back-pedaling, and means for driving the bicycle by forward-pedaling, substantially as described.

5. In a bicycle, in combination, a hanger, a sleeve within the hanger carrying ball-cups at either end which revolubly engage the hanger, a coiled spring surrounding the sleeve between the cups and secured at one end to the sleeve and at the other to the hanger, a brake mechanism suitably connected with said sleeve whereby the movement of the sleeve in one direction applies the brake, a crank-shaft within the sleeve, cones carried by the crank-shaft, balls rolling between said cones and ball-cups, said crank-shaft carrying means for engaging said sleeve and partially rotating it when the crank is moved backward, said spring tending to move the sleeve in the opposite direction, and means for driving the bicycle by forward-pedaling, substantially as described.

6. In a bicycle, in combination, a hanger A, a sleeve B within the same having ball-cups $b$ and $b'$ at either end, a spring G surrounding the sleeve between the ball-cups and secured at one end to the sleeve and at the other to the hanger, a disk $b^2$ secured to the sleeve at one end, a link connecting the sleeve with the brake member, a crank journaled on balls rolling in the ball-cups, a pawl revolving with the crank, mechanism for causing the same to grip and turn backward the disk $b^2$ when the crank is back-pedaled, and means for driving the bicycle by forward-pedaling, substantially as described.

7. In a bicycle, in combination, a hanger A, a sleeve B within the same, a toothed disk $b^2$ secured to said sleeve at one end, a bracket carried on the hanger, a shaft E within the same, a brake member secured to said shaft, a link connecting the disk $b^2$ with said shaft whereby the rotation of a sleeve in one direction applies the brake, a suitably-journaled crank, mechanism between it and the disk $b^2$ whereby when the crank is back-pedaled the disk is engaged and partially rotated in the direction to apply the brake, means for returning the sleeve into position to be again operated by back-pedaling, and means for driving the bicycle by forward-pedaling, substantially as described.

8. In a bicycle, in combination, a crank, a driving-gear having ratchet-teeth, a disk revolving with the crank, pawls carried by said disk and adapted to engage with the ratchet-teeth of said gear, a plate carried by said disk and adapted to revolve with said gear, and also allowed a limited movement independent thereof, there being suitable friction between said plate and gear, a brake mechanism having ratchet-teeth arranged oppositely to the ratchet of the driving-gear, pawls carried by said disk normally out of engagement with the ratchet-teeth of said brake mechanism, and means whereby the movement of said plate relative to the gear locks one set of pawls out of engagement with the gear and allows the other set to move into engagement with the brake mechanism, substantially as described.

9. In a bicycle, a disk P, a driving-gear S surrounding the same, annularly-placed ratchet-teeth $s$ on said gear, a pawl T carried by said disk, said pawl having a shoulder and adapted to engage said teeth and adapted also to be forced inward out of engagement with the gear when the gear moves forward faster than the disk, a plate in frictional engagement with the driving-gear, a lug or rib on said plate which normally does not interfere with the pawl engaging said teeth but is adapted to engage the shoulder on said pawl and hold the same out of engagement with the gear when the plate is partially revolved relative to the gear, in combination with brake mechanism, and mechanism for automatically connecting and disconnecting the brake with the disk, substantially as described.

10. In a bicycle, in combination, a crank, a disk P secured thereto, a pawl T carried by said disk and movable substantially parallel with a radius of the disk, a pawl Q carried by said disk and movable substantially parallel with the axis of the disk, a driving-gear adapted to be engaged by one of said pawls, a brake mechanism adapted to be drivingly engaged by the other, the engagement with the driving-gear being a ratchet connection whereby a forward movement of the gear relative to the disk forces the pawl away from the gear, a plate revolving with the gear but allowed a movement independent thereof when said pawl is out of engagement with the gear, means whereby said movement of the plate locks in its disengaged position the driving-pawl but allows the brake-pawl to engage the brake mechanism, the reverse movement of the plate causing the disengagement of the brake-pawl and allowing the reëngagement of the driving-pawl, substantially as described.

11. In combination, a disk P, a pawl T and a pawl Q carried by said disk, a driving-gear S, ratchet-teeth thereon with which said pawl T may engage, plates V and R on either side of the disk extending over the hub of the driving-gear, frictional washers between said plates and the driving-gear, a stop and coöperating separated shoulders carried by one of said plates and the disk P, whereby limited independent movement is allowed between said plate and disk, means whereby one of said plates in one of its extreme positions engages the pawl Q and releases the pawl T, and in the other extreme position engages the pawl T and releases the pawl Q, mechanism adapted to be drivingly engaged by said pawl Q when released, and means for rotating said disk P, substantially as described.

12. In a bicycle, in combination, the crank-shaft J, the disk P secured thereto, the pawls T and Q movably carried by said disk, the driving-gear S having ratchet-teeth with which said pawl T may engage, whereby if the gear S is moved relatively ahead of the disk P the ratchet-surface causes the disengagement of the pawl T, the plates R and V on either side of the disk, the washers Z between the plates and the hub of the driving-gear, a lug carried by said plate R, a shoulder on the pawl T with which said lug may engage when the pawl is disengaged from the driving-gear, said disk having an opening which comes opposite the pawl Q and releases the same in another position of the disk, and mechanism driven by said pawl Q when released, substantially as described.

13. In a bicycle, in combination, a driving-gear having ratchet-teeth, a disk P, a pawl T carried thereby and adapted to engage with said ratchet-teeth, a spring T' acting on said pawl to cause such engagement, a pawl Q, a brake mechanism with which said pawl may engage, a spring $Q^2$ tending to cause such engagement, a plate R having an opening through which said pawl Q may pass, said plate also having a lug $r^2$ which is adapted to engage with a shoulder on the pawl T and hold it out of engagement with the gear, said lug and opening being so placed on the plate R that they cannot both be in engagement with their respective pawls at the same time, means for establishing friction of the desired amount between said plate and the driving-gear, and means for rotating the disk P, substantially as described.

In testimony whereof I hereunto affix my signature in the presence of two witnesses.

WILLIAM MORRIS.

Witnesses:
ALBERT H. BATES,
PHILIP E. KNOWLTON.